US011999175B2

(12) United States Patent
Abe et al.

(10) Patent No.: US 11,999,175 B2

(45) Date of Patent: Jun. 4, 2024

(54) PRINTING APPARATUS AND CARRIAGE APPARATUS

(71) Applicant: CANON KABUSHIKI KAISHA, Tokyo (JP)

(72) Inventors: Tomohito Abe, Kanagawa (JP); Kenta Iimura, Kanagawa (JP); Kichinosuke Hirokawa, Tokyo (JP); Akira Fujikake, Kanagawa (JP); Toshiaki Yamaguchi, Tokyo (JP); Daigo Kuronuma, Kanagawa (JP); Masakazu Nagashima, Kanagawa (JP); Naoaki Wada, Kanagawa (JP); Ryohei Maruyama, Kanagawa (JP); Hideyuki Nozawa, Tochigi (JP); Hiromasa Yoneyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 17/742,534

(22) Filed: May 12, 2022

(65) Prior Publication Data

US 2022/0363081 A1 Nov. 17, 2022

(30) Foreign Application Priority Data

May 13, 2021 (JP) ................................ 2021-081835

(51) Int. Cl.

*B41J 25/00* (2006.01)

*B41J 2/045* (2006.01)

(52) U.S. Cl.

CPC .................................. *B41J 25/006* (2013.01)

(58) Field of Classification Search

CPC ............................ B41J 2/04501; B41J 25/006

See application file for complete search history.

(56) References Cited

U.S. PATENT DOCUMENTS

| | | | |
|---|---|---|---|
| 2003/0206212 A1 | 11/2003 | Mitarai et al. | |
| 2022/0097427 A1 | 3/2022 | Abe et al. | |
| 2022/0097429 A1 | 3/2022 | Takahashi et al. | |

FOREIGN PATENT DOCUMENTS

| | | | |
|---|---|---|---|
| JP | 3604994 B2 | | 12/2004 |
| JP | 2011-176901 A | | 9/2011 |
| JP | 2011176901 A | * | 9/2011 |

OTHER PUBLICATIONS

U.S. Appl. No. 17/742,524, filed May 12, 2022, Ryohei Maruyama Daigo Kuronuma Masakazu Nagashima Tomohito Abe Kenta Imura Hiromasa.

(Continued)

*Primary Examiner* — Jason S Uhlenhake

(74) *Attorney, Agent, or Firm* — Venable LLP

(57) ABSTRACT

A printing apparatus includes a carriage mounted with a printing unit, a belt, a first motor configured to drive the belt at one end in a widthwise direction, a second motor configured to drive the belt at the other end in the widthwise direction, and a control unit configured to control the first motor and the second motor. The control unit performs first control by driving the first motor in which the carriage moves from a state in which the carriage is stopped. In the control, the second motor is controlled from a first state in which its torque is lower than that of the first motor to a second state in which its torque is higher than that in the first state.

20 Claims, 9 Drawing Sheets

(56) References Cited

OTHER PUBLICATIONS

Extended European Search Report dated Oct. 5, 2022, in corresponding European Patent Application No. 22169184.3.
U.S. Appl. No. 17/742,545, filed May 12, 2022, Naoaki Wada Daigo Kuronuma Masakazu Nagashima Tomohito Abe Ryohei Maruyama Kenta Iimura Hiromasa Yoneyama Kichinosuke Hirokawa Akira Fujikake Toshiaki Yamaguchi.

* cited by examiner

PRINTING APPARATUS AND CARRIAGE APPARATUS

BACKGROUND OF THE INVENTION

Field of the Invention

The present invention relates to a printing apparatus.

Description of the Related Art

There is known a printing apparatus that performs printing on a print medium such as paper by discharging ink from a printhead while moving a carriage mounted with the printhead. With such a printing apparatus, demands for improving the productivity and the image quality of printing are increasing in recent years. Therefore, while the weight of the printhead increases due to the tendency of the printhead to become longer and have a higher density, the carriage is demanded to move with a high velocity and improve the positional accuracy.

As a driving method of the carriage, a method is known in which the carriage is connected to an endless belt (timing belt) and the carriage is moved by causing the belt to travel by a driving force of a motor. It is conceivable to employ a large high-output motor to increase the moving velocity of the carriage, but the market distribution scale of the large high-output motor is small and the cost thereof is high. Japanese Patent No. 3604994 discloses an apparatus in which one of two pulleys for causing the belt to travel is rotated by a stepper motor and the other one is rotated by a DC motor.

While the carriage is moved, a slack of the belt may be temporarily generated. This slack may cause an unstable operation of the carriage.

SUMMARY OF THE INVENTION

The present invention provides a technique that eliminates a slack of a belt and improves the operational stability of a carriage.

According to an aspect of the present invention, there is provided a printing apparatus comprising: a carriage mounted with a printing unit configured to perform printing on a print medium; a belt configured to reciprocate the carriage in a widthwise direction of the print medium; a first motor configured to drive the belt at one end in the widthwise direction; a second motor configured to drive the belt at the other end in the widthwise direction; and a control unit configured to control the first motor and the second motor, wherein the control unit performs first control by driving the first motor in which the carriage moves from a state in which the carriage is stopped, and in the first control, an output of the second motor is controlled from a first state lower than an output of the first motor to a second state higher than the first state.

Further features of the present invention will become apparent from the following description of exemplary embodiments (with reference to the attached drawings).

DESCRIPTION OF THE EMBODIMENTS

Figure 1:
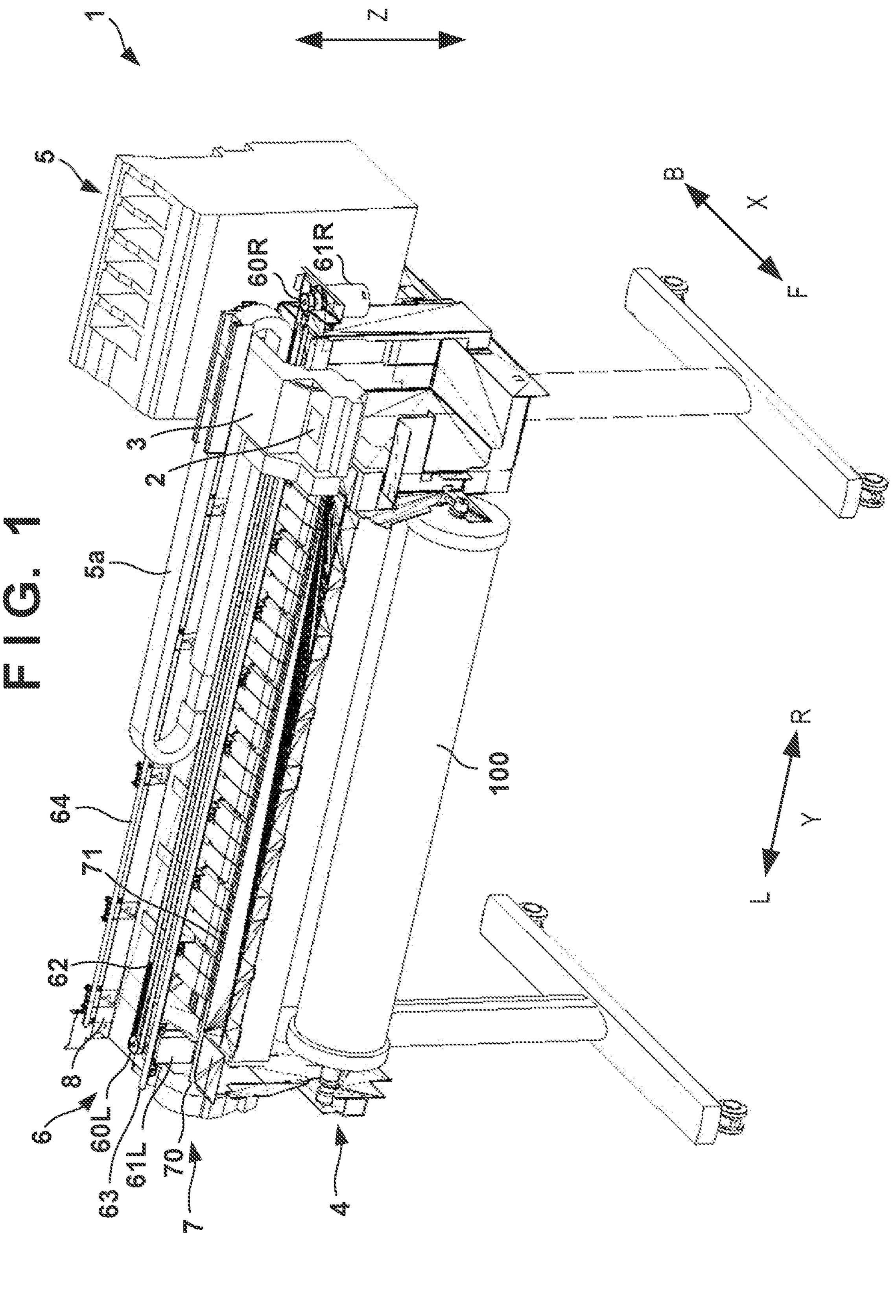
FIG. 1 is a perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Outline of Printing Apparatus>

Figure 2:
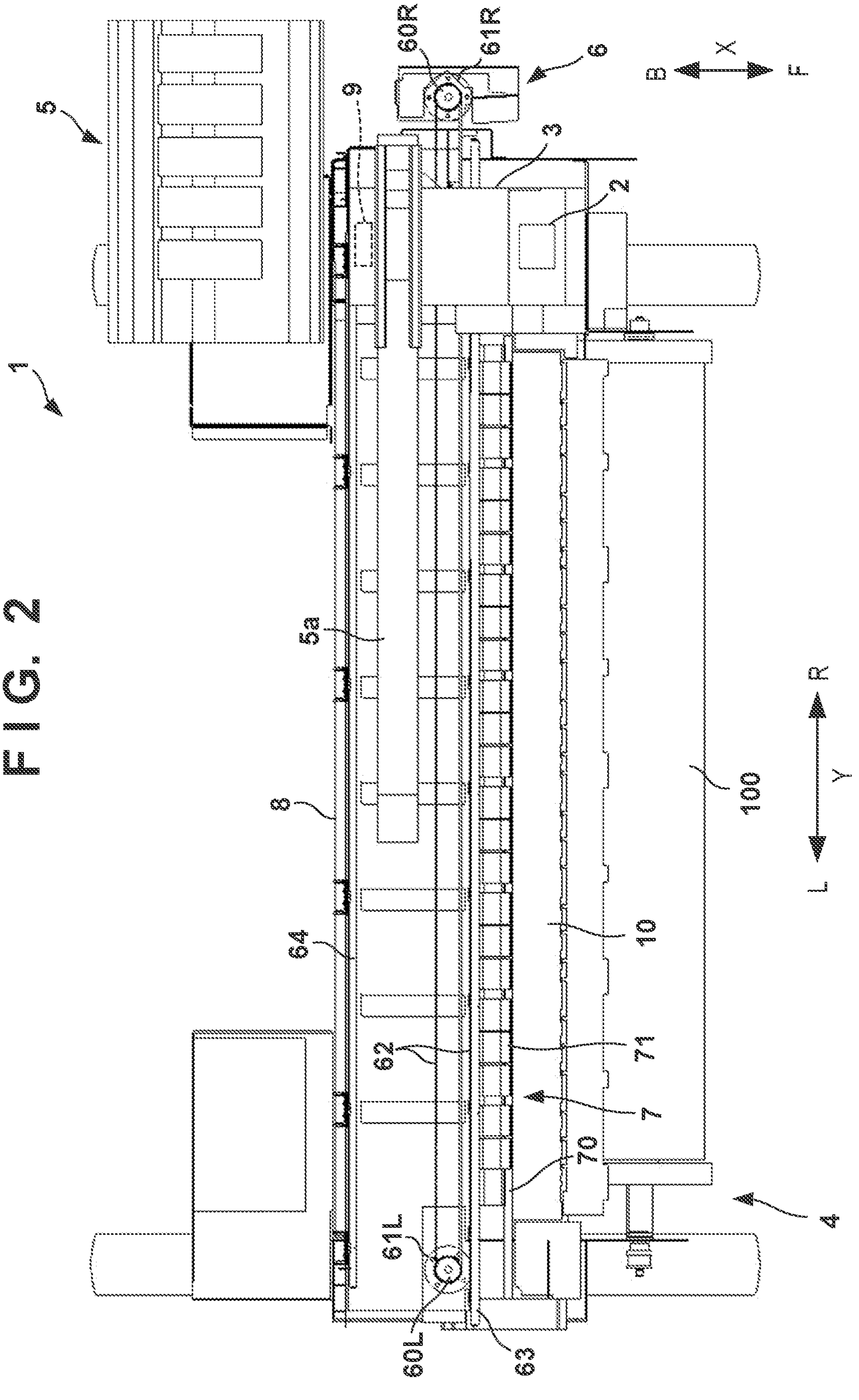
FIG. 2 is a plan view of the printing apparatus shown in FIG. 1.

FIG. 1 is a perspective view of a printing apparatus 1 in this embodiment, and FIG. 2 is a plan view of the printing apparatus 1. In the drawings, an arrow Y indicates the widthwise direction (left-and-right direction) of the printing apparatus 1, L indicates the left side, and R indicates the right side. An arrow X indicates the depth direction (front-and-rear direction) of the printing apparatus 1, F indicates the front side, and B indicates the rear side. An arrow Z indicates the vertical direction. In this embodiment, a case will be described in which the present invention is applied to a serial inkjet printing apparatus that performs printing by discharging ink to a print medium. However, the present invention is also applicable to a printing apparatus of another form.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, a plastic film, and the like may be used as print media.

The printing apparatus 1 includes a feeding unit 4. The feeding unit 4 holds a print medium to be fed into the printing apparatus 1. In this embodiment, a roll sheet 100 is used as the print medium. However, the print medium may be a cut sheet. The roll sheet 100 is obtained by winding a sheet into a roll form around a cylindrical core. The roll sheet 100 has, for example, a width of 10 to 60 inches in the X direction.

The printing apparatus 1 includes a conveying unit 7. The conveying unit 7 is a sheet conveying mechanism that includes a conveying roller 70 and a pinch roller 71 pressed against the conveying roller 70. The sheet pulled out from the roll sheet 100 is fed to the rear side in the X direction.

Then, the sheet is folded to the front side and reaches the conveying unit 7. The sheet is then nipped between the conveying roller 70 and the pinch roller 71 of the conveying unit 7 and conveyed on a platen 10 to the front side in the X direction.

The printing apparatus 1 includes a printhead 2 that prints an image by discharging ink to the sheet conveyed on the platen 10 by the conveying unit 7. The printhead 2 includes a plurality of nozzles which discharge ink. An energy element that generates energy for discharging ink by supply of power is arranged in each nozzle. The energy element is, for example, an electrothermal transducer such as a heater or a piezoelectric transducer such as a piezoelectric element. The printhead 2 can discharge different kinds of ink (for example, ink of a plurality of colors such as black (K), cyan (C), magenta (M), and yellow (Y)), and multiple nozzles are formed for each kind of ink.

Ink is supplied to the printhead 2 from an ink container 5. The ink container 5 includes a tank for each kind of ink, and ink is stored in the tank. Ink is supplied from the ink container 5 to the printhead 2 via a flexible tube (not shown) supported by a chain link 5*a*.

The printhead 2 is mounted on a carriage 3, and the printing apparatus 1 includes a carriage apparatus described below. The carriage 3 is moved by a driving unit 6 in the widthwise direction (Y direction) of the print medium. The driving unit 6 includes guide rails 63 and 64 extended parallel to the Y direction. The carriage 3 engages with the guide rails 63 and 64 so as to be guided in movement in the Y direction. The driving unit 6 includes pulleys 60R and 60L as an example of a plurality of rotation members. The pulleys 60R and 60L are spaced apart from each other in the Y direction and have the same specifications (outer diameter, weight, and the like). A timing belt 62, which is an example of an endless belt, is wound around the pulleys 60R and 60L. The carriage 3 is connected to the timing belt 62.

The driving unit 6 includes carriage motors 61R and 61L. The carriage motor 61R is a motor for driving the timing belt 62 at one end in the Y direction, and is a driving source for rotating the pulley 60R. The carriage motor 61L is a motor for driving the timing belt 62 at the other end in the Y direction, and is a driving source for rotating the pulley 60L. In this embodiment, the carriage motor 61R is configured to directly rotate the pulley 60R while the pulley 60R is connected to the output shaft of the carriage motor 61R. However, the carriage motor 61R may be configured to rotate the pulley 60R via a decelerator.

Similarly, the carriage motor 61L is configured to directly rotate the pulley 60L while the pulley 60L is connected to the output shaft of the carriage motor 61L. However, the carriage motor 61L may be configured to rotate the pulley 60L via a decelerator. Each of the carriage motors 61R and 61L is, for example, a brushless DC motor and, in this embodiment, the carriage motors 61R and 61L are the same product. Accordingly, the carriage motors 61R and 61L have the same performance and characteristics during driving.

The carriage 3 can be moved by driving one or both of the carriage motors 61R and 61L to cause the timing belt 62 to travel. Further, by switching the rotation directions of the carriage motors 61R and 61L, the carriage 3 can be reciprocated in the Y direction. In this embodiment, it is possible to move the carriage 3 by outputs of two carriage motors 61R and 61L, so that the higher output can be obtained than in a case of driving by one carriage motor. Therefore, even if the carriage 3 is heavy, it can be moved at a higher velocity.

An encoder sensor 9 is mounted on the carriage 3. The encoder sensor 9 reads a linear scale (encoder scale) 8 extended in the Y direction and outputs a signal indicating the Y-direction position of the carriage 3. The linear scale 8 includes, for example, transmissive portions and light shielding portions repeatedly formed at predetermined constant intervals in the Y direction. The encoder sensor 9 is, for example, an optical sensor which includes a light emitting unit and a light receiving unit. The encoder sensor 9 outputs, as a detection signal, a light-receiving result of the light receiving unit which changes depending on whether light is received from the transmissive portion or the light shielding portion.

When the carriage 3 moves in the Y direction, the encoder sensor 9 can obtain a pulsed signal. By counting the number of pulses, the Y-direction position of the carriage 3 can be calculated. Further, the moving velocity of the carriage 3 can be calculated from the number of pulses per unit time. For example, assume that the transmissive portion and the light shielding portion of the linear scale 8 are repeated in 150 cycles per inch. Each time the carriage moves $1/150$ inch, the encoder sensor 9 obtains a one-pulse signal. If three pulses are counted in a time of 500 μs, the velocity v of the carriage 3 can be calculated as $v=(3/150 \text{ inch})/500\ \mu s=40$ ips.

In a printing operation, the sheet is intermittently conveyed by the conveying unit 7 (stepped conveyance). While the conveyance of the sheet is stopped, the carriage 3 is moved in the main scanning direction (Y direction) and ink is discharged from the printhead 2 onto the sheet (printing scan). When printing for one scan ends, the conveying unit 7 conveys the sheet by a predetermined amount in the subscannig direction (a direction orthogonal to the main scanning direction). Then, printing scan is performed. By repeating printing scan and stepped conveyance of the sheet, an image is printed on the sheet. The sheet where image printing is completed is cut by a cutter mechanism (not shown).

<Control Apparatus>

Figure 3A:
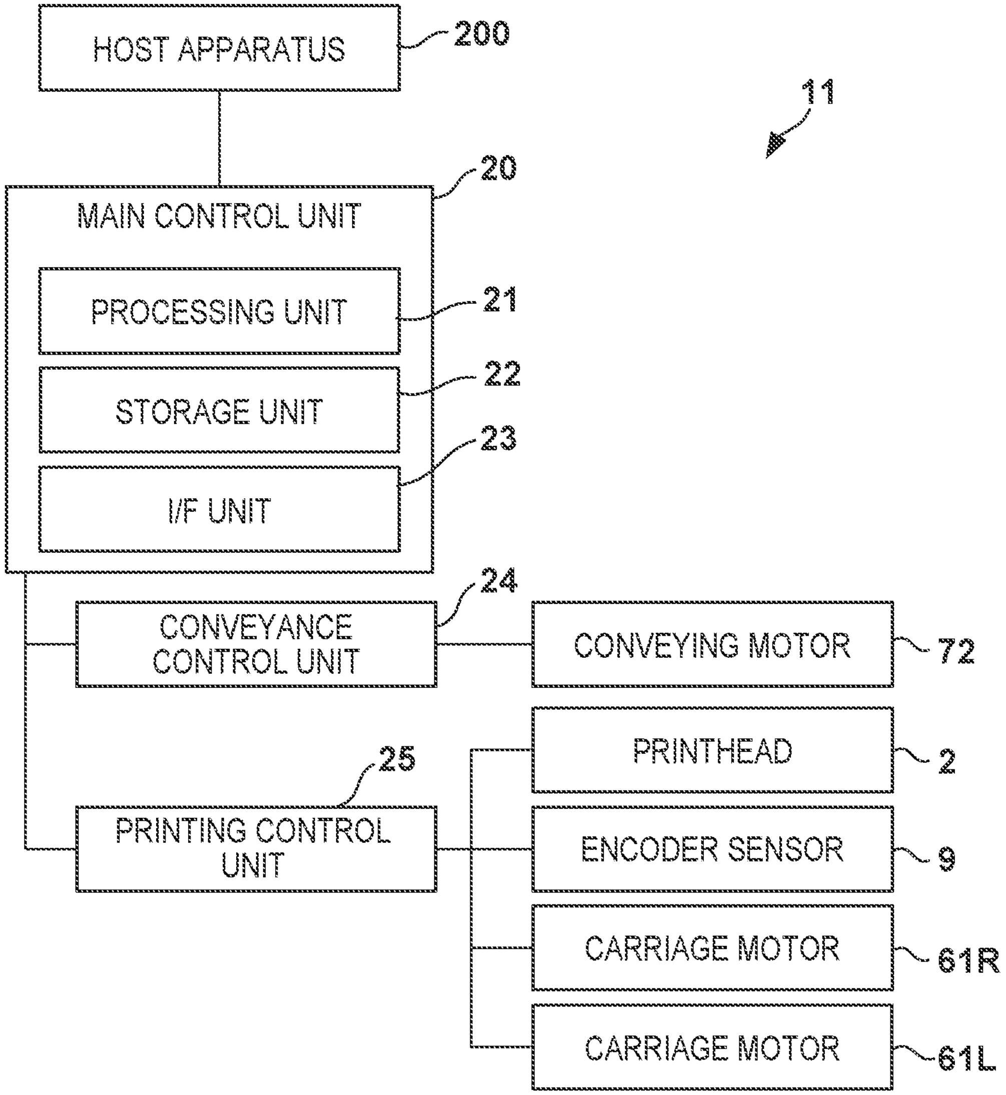
FIG. 3A is a block diagram of a control apparatus of the printing apparatus shown in FIG. 1.

With reference to FIG. 3A, a control apparatus 11 of the printing apparatus 1 will be described. The control apparatus 11 is a circuit that includes at least one processor and at least one storage device, and the processor executes a program stored in the storage device. The control apparatus 11 according to this embodiment includes a main control unit 20, a conveyance control unit 24, and a printing control unit 25. The main control unit 20 receives image data and a printing instruction thereof from a host apparatus 200 and performs a printing operation.

The main control unit 20 includes a processing unit 21, a storage unit 22, and an interface unit (I/F unit) 23, and controls the entire printing apparatus 1. The processing unit 21 is a processor represented by a CPU, and executes a program stored in the storage unit 22. The storage unit 22 is a storage device such as a RAM or a ROM, and stores programs and data.

The conveyance control unit 24 and the printing control unit 25 perform conveyance control and printing control, respectively, by following instructions of the main control unit 20. For example, similar to the main control unit 20, each of the control units 24 and 25 includes a processing unit, a storage unit, and an I/F unit. A drive circuit for driving the motor and the like are also included.

The conveyance control unit 24 controls a conveying motor 72 that rotates the conveying roller 70 to perform conveyance control of the sheet. Note that a detection result of the sensor that detects the rotation amount of the conveying motor 72 and a detection result of the sensor that detects the conveyance position of the sheet (both sensors are not shown) are input to the conveyance control unit 24, and the conveyance control unit 24 controls the conveying motor 72 based on these detection results.

The printing control unit 25 performs driving control of the carriage motors 61R and 61L (movement control of the carriage 3) and driving control of the printhead 2 (ink discharge control) based on a detection result of the encoder sensor 9.

<Movement Control of Carriage>

Figure 3B:
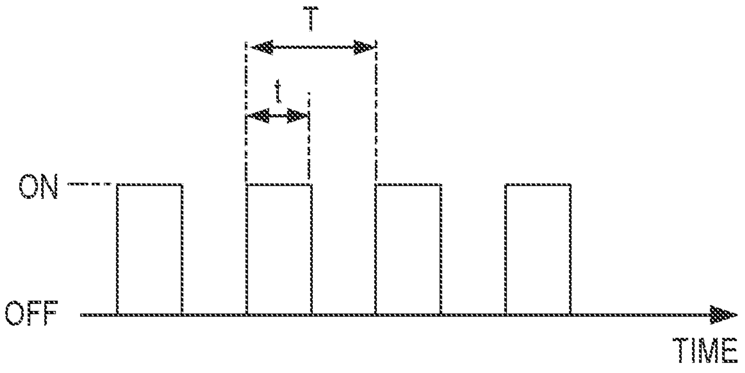
FIG. 3B is a view for explaining PWM control.

The carriage motors 61R and 61L are controlled independently. In this embodiment, driving control of the carriage motors 61R and 61L is PWM (Pulse Width Modulation) control. In PWM control, the output power is controlled by the ratio (duty ratio) of the energization time (ON time) per unit time. FIG. 3B is a view for explaining this. FIG. 3B shows an example in which ON time t per unit time T is ½T, and the duty ratio is 50%. As the duty ratio increases, the power supplied to each of the carriage motors 61R and 61L increases, and the output of each of the carriage motors 61R and 61L increases. The output of each of the carriage motors 61R and 61L is maximum when the duty ratio is 100%. Note that PWM control is employed as driving control of the carriage motors 61R and 61L in this embodiment, but another control method may be employed.

Figure 4A:
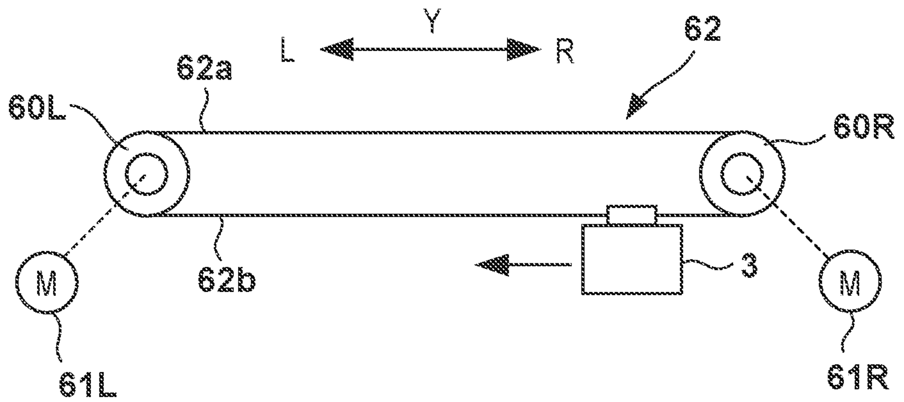
FIGS. 4A and 4B are views showing an example of the reciprocating movement mode of a carriage.
Figure 4B:
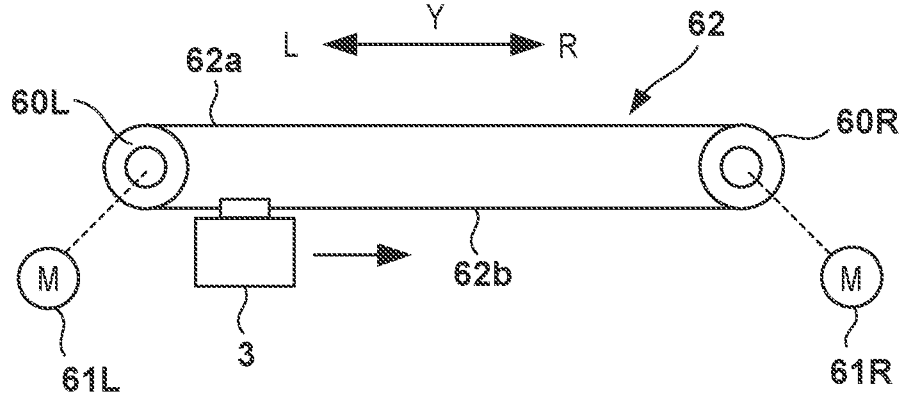

FIGS. 4A and 4B show the reciprocating movement mode of the carriage 3. The basic movement mode of the carriage 3 includes forward movement from a stop position at the right end of the movement range to the left end as shown in FIG. 4A and backward movement from a stop position at the left end of the movement range to the right end as shown in FIG. 4B. The forward movement is the control for moving the carriage 3 from the carriage motor 61R side to the carriage motor 61L side in the Y direction. The backward movement is the control for moving the carriage 3 from the carriage motor 61L side to the carriage motor 61R side in the Y direction.

The movement direction in the forward movement of the carriage 3 may be referred to as the forward direction, and the movement direction in the backward movement may be referred to as the backward direction. For the movement of the carriage 3 as described above, in this embodiment, it is possible to select the movement by the driving force of the carriage motor 61R alone, the movement by the driving force of the carriage motor 61L alone, and the movement by the driving forces of both of the carriage motors 61R and 61L.

Figure 5A:
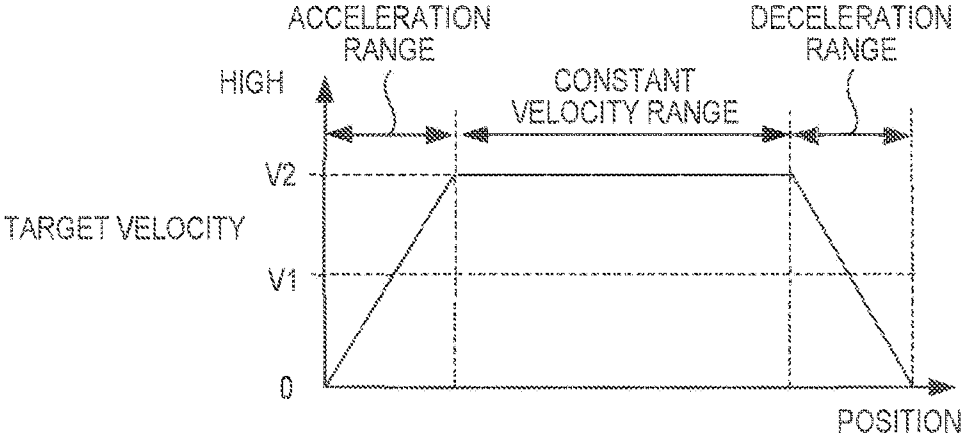
FIG. 5A is a graph showing the target velocity with respect to the position of the carriage.

The movement control of the carriage 3 in this embodiment is feedback control. At each of a large number of Y-direction positions of the carriage 3, a target velocity at the position is set in advance. FIG. 5A shows an example (velocity profile). The ordinate represents the target velocity of the carriage 3, and the abscissa represents the Y-direction position of the carriage 3.

The acceleration start position, the stop target position, and the deceleration start position of the carriage 3 are determined in advance. In this embodiment, the Y-direction positions of the carriage 3 are roughly classified into an acceleration range, a constant velocity range, and a deceleration range. The carriage 3 is accelerated to a predetermined velocity V2, performs printing scan during the constant velocity range of the velocity V2, and then is decelerated and stops. The target velocity for each position can be set such that the velocity and operation of the carriage 3 moderately change without a sharp change.

During the movement of the carriage 3, the printing control unit 25 calculates the actual position and actual velocity of the carriage 3 from the detection results of the encoder sensor 9. The printing control unit 25 increases or decreases the duty ratio in accordance with the difference between the target velocity at the actual position and the actual velocity. For example, if the actual velocity has not reached the target velocity, the duty ratio is increased. To the contrary, if the actual velocity exceeds the target velocity, the duty ratio is decreased.

Figure 5B:
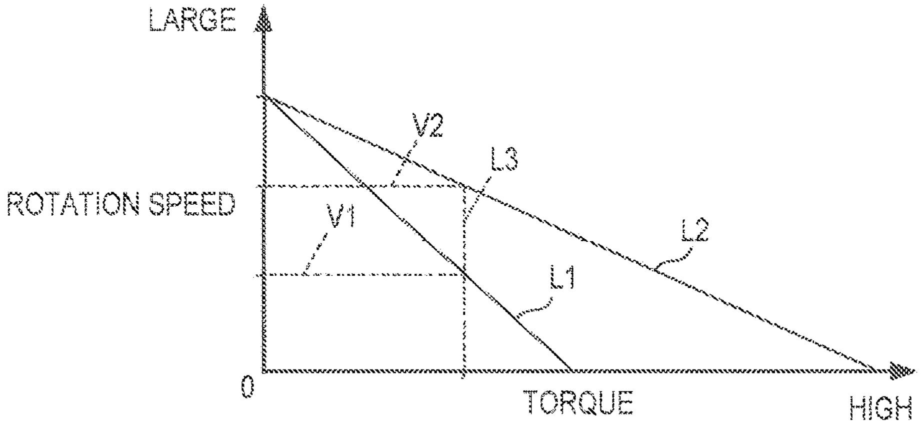
FIG. 5B is a graph showing the rotation speed/torque characteristic of a carriage motor.

FIG. 5B shows the rotation speed/torque characteristics of the carriage motors 61R and 61L. A line L1 indicates the rotation speed/torque characteristic obtained when the carriage motor 61R or 61L is solely driven. A line L2 indicates the rotation speed/torque characteristic obtained when driving both the carriage motors 61R and 61L. This corresponds to the sum of the torques of the rotation speed/torque characteristics of the two carriage motors 61R and 61L. When driving both the carriage motors 61R and 61L, the total torque is twice the torque of the single carriage motor for the same rotation speed.

The rotation speed/torque characteristics of the carriage motors 61R and 61L shown in FIG. 5B can be replaced with the velocity/acceleration characteristics of the carriage 3. When the carriage motor 61R or 61L is solely driven, the carriage can be moved at the velocity and the acceleration within the triangular range surrounded by the ordinate, the abscissa, and the line L1. When both the carriage motors 61R and 61L are driven, the carriage 3 can be moved at the velocity and the acceleration within the triangular range surrounded by the ordinate, the abscissa, and the line L2.

A line L3 corresponds to the acceleration in a case of driving both the carriage motors 61R and 61L to accelerate the carriage 3 to the velocity V2. Even when the carriage motor 61R or 61L is solely driven, the carriage 3 can be accelerated up to the velocity V1 with the same acceleration. This also applies to a case of deceleration.

<Elimination of Slack of Belt>

When moving the carriage 3 from a stop state, a slack can be generated in the timing belt 62. This slack may cause an unstable operation of the carriage 3. A specific example will be described. As shown in FIGS. 4A and 4B, the timing belt 62 includes two travel regions 62*a* and 62*b* between the pulley 60R and the pulley 60L. The travel region 62*a* is a region on the side where the carriage 3 is not connected, and the region 62*b* is a region on the side where the carriage 3 is connected.

Assume a case in which, when the carriage 3 is moved forward as shown in FIG. 4A, the timing belt 62 is caused to travel by driving the carriage motor 61L alone from a state in which the carriage 3 is stopped. Since a resistance such as a static friction works in the movement of the carriage 3, the movement of the carriage 3 may slightly delay with respect to the start of traveling of the timing belt 62. Then, a slack may be generated in the travel region 62*a*. Thereafter, when the carriage 3 starts to move, a force of returning to a tense state acts on the travel region 62*a*. As a result, string vibration may occur in the travel region 62*a*, and this may cause an unstable operation of the carriage 3. This phenomenon can also occur in a case in which both the carriage motors 61R and 61L are driven but the torque of the carriage motor 61L is higher (the rotation speed of the pulley 60L is higher).

This also applies to a case in which the carriage 3 is moved backward as shown in FIG. 4B. Assume a case in which the carriage motor 61R alone is driven to cause the timing belt 62 to travel. If the movement of the carriage 3 slightly delays with respect to the start of traveling of the timing belt 62, a slack may be generated in the travel region 62*a*. Thereafter, when the carriage 3 starts to move, a force of returning to a tense state acts on the travel region 62*a*. As a result, string vibration may occur in the travel region 62*a*, and this may cause an unstable operation of the carriage 3. This phenomenon can also occur in a case in which both the carriage motors 61R and 61L are driven but the torque of the carriage motor 61R is higher (the rotation speed of the pulley 60R is higher).

To prevent this, when starting the forward movement shown in FIG. 4A, generation of the slack can be eliminated by setting the output (torque here) of the carriage motor 61L to be smaller than the output of the carriage motor 61R. Similarly, when starting the backward movement shown in FIG. 4B, generation of the slack can be eliminated by setting the output of the carriage motor 61R to be smaller than the output of the carriage motor 61L.

Control Example

As exemplarily shown in FIG. 5B, in this embodiment, when accelerating the carriage 3 to the velocity V2, the carriage 3 can be accelerated using either one of the carriage motor 61R and 61L during the period of accelerating the carriage 3 to the velocity V1. Therefore, the velocity V1 is set as a threshold velocity, and only one of the carriage motors 61R and 61L is driven until the velocity V1 is reached. Then, the carriage motor to be driven is selected based on whether the carriage 3 is moved forward or backward. If the carriage 3 is moved forward, the carriage motor 61R is driven. If the carriage 3 is moved backward, the carriage motor 61L is driven. With this, it is possible to accelerate the carriage 3 at the required acceleration while preventing generation of a slack of the timing belt 62 at the start of movement of the carriage 3.

Figure 6:
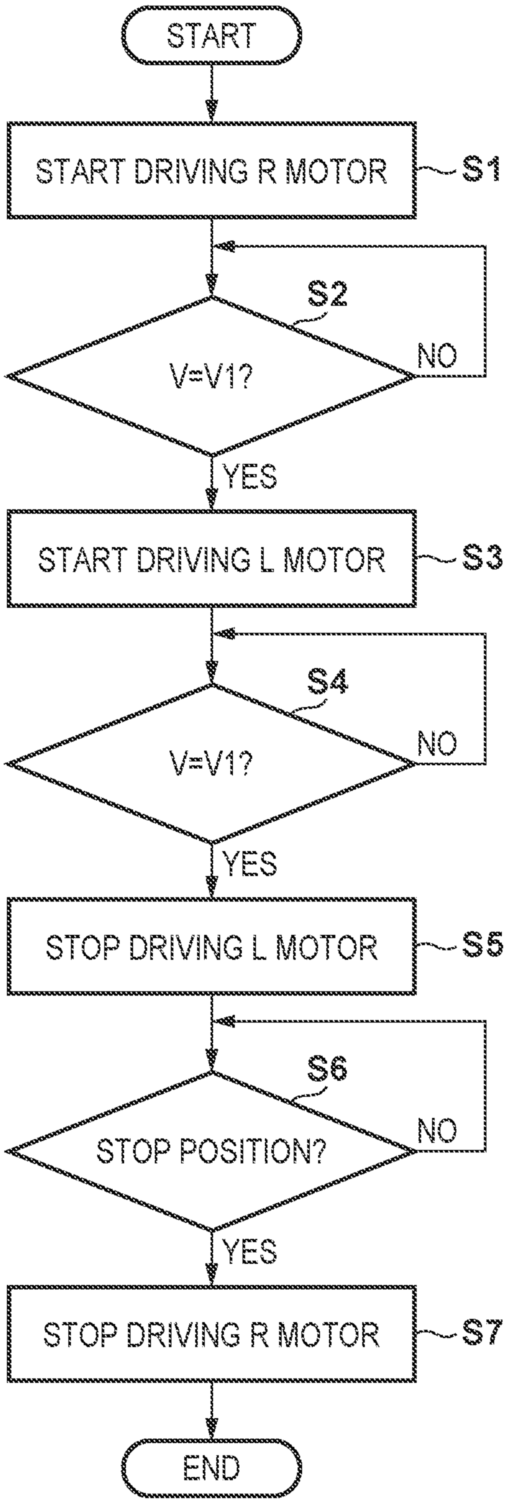
FIG. 6 is a flowchart showing an example of movement control in forward movement of the carriage.

FIG. 6 is a flowchart showing an example of processing performed by the printing control unit 25, which is an example of movement control in forward movement of the carriage 3, and FIGS. 7A to 7D are views for explaining the operation of the carriage 3. FIG. 6 particularly shows an example of processing regarding switching of operations of the carriage motors 61R and 61L. In FIGS. 7A to 7D, among arrows each indicating the rotation direction of each of the pulleys 60R and 60L, a solid arrow indicates driving-rotation, and a broken arrow indicates driven-rotation.

Figure 7A:
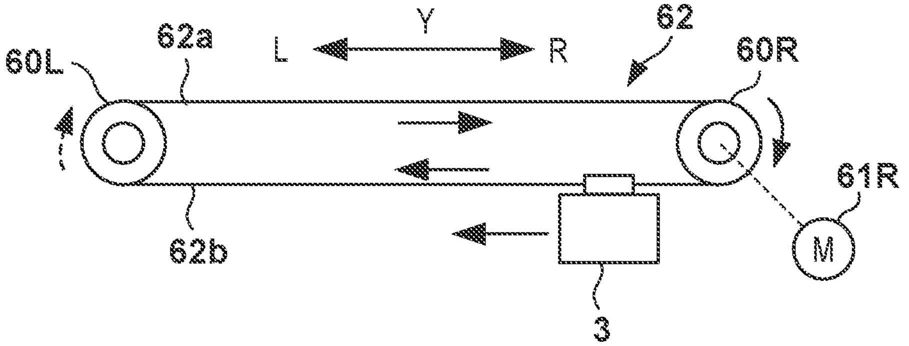
FIGS. 7A to 7D are views for explaining an operation of the carriage in forward movement.

In step S1 of FIG. 6, driving of the carriage motor 61R is started. With this, the pulley 60R is driving-rotated as shown in FIG. 7A, the timing belt 62 is caused to travel, and the pulley 60L is driven-rotated. An appropriate tension is applied to the travel region 62*a*, and generation of a slack can be prevented.

Figure 7B:
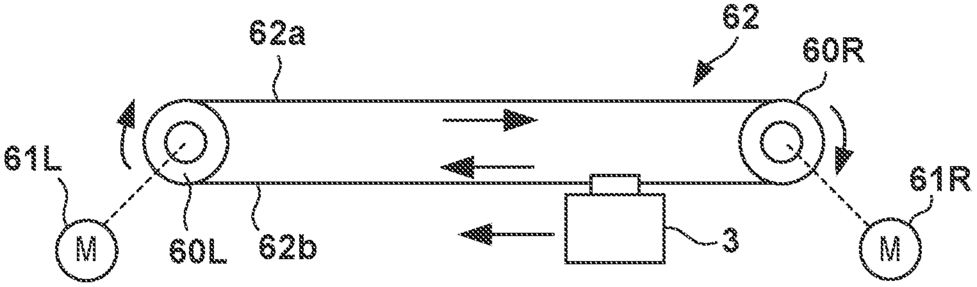

In step S2 of FIG. 6, based on a detection result of the encoder sensor 9, it is determined whether the velocity of the carriage 3 has reached the threshold velocity (velocity V1). If the velocity of the carriage 3 has reached the velocity V1, the process advances to step S3. In step S3, driving of the carriage motor 61L is started. With this, as shown in FIG. 7B, the driving-rotation of the pulley 60L is performed in addition to the driving-rotation of the pulley 60R.

After switching driving of the carriage motor 61R alone to driving of both the carriage motors 61R and 61L in step S3, the duty ratio of PWM control of the carriage motor 61R may be equal to that of the carriage motor 61L. Upon the switching, for example, if the duty ratio of PWM control of the carriage motor 61R before the switching is $\alpha$ %, the duty ratio of each of the carriage motors 61R and 61L may be set to $\alpha/2$%. Then, in accordance with the target velocity and the actual velocity of the carriage 3 thereafter, the duty ratios of the carriage motors 61R and 61L may be similarly increased or decreased.

Figure 7C:
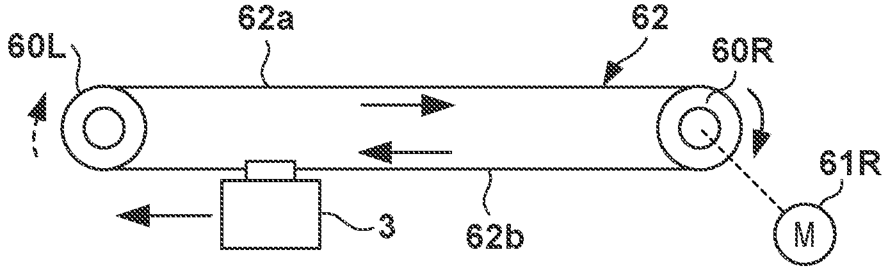
Figure 7D:
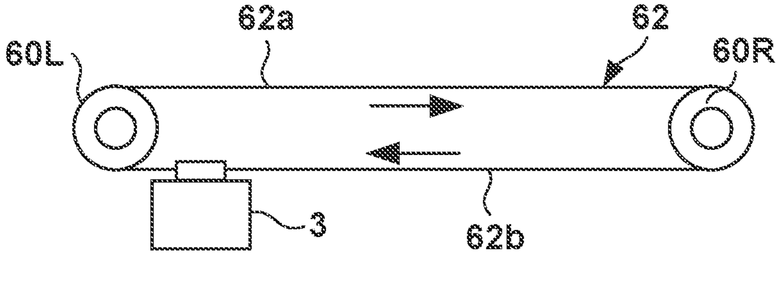

With the control as described above, the velocity of the carriage 3 reaches the velocity V2. Then, the carriage 3 is moved at a constant velocity, and printing scan is performed. After that, if the position of the carriage 3 reaches the deceleration position, deceleration of the carriage 3 is started. In step S4 of FIG. 6, based on a detection result of the encoder sensor 9, it is determined whether the velocity of the carriage 3 has decreased to the threshold velocity (velocity V1). If the velocity of the carriage 3 has decreased to the velocity V1, the process advances to step S5. In step S5, driving of the carriage motor 61L is stopped. Thus, the pulley 60L is driven-rotated again as shown in FIG. 7C.

When switching driving of both the carriage motors 61R and 61L to driving of the carriage motor 61R alone in step S5, the duty ratio of PWM control of the carriage motor 61R may be doubled. For example, if the duty ratio of each of the carriage motors 61R and 61L is $\beta$ %, the duty ratio of the carriage motor 61R may be set to $2\times\beta$ %.

In step S6, based on a detection result of the encoder sensor 9, it is determined whether the carriage 3 has reached the stop position. If the carriage 3 has reached the stop position, the process advances to step S7 and the carriage motor 61R is stopped. After the deceleration of the carriage 3 is started, during the period from the velocity V1 to the stop, the pulley 60R is driving-rotated and the pulley 60L is driven-rotated. Therefore, upon the stop, the timing belt 62 stops while an appropriate tension is applied to the travel region 62*a*. In the next backward movement, generation of a slack in the travel region 62*a* can be suppressed and the responsiveness of the carriage 3 can be improved.

Figure 8:
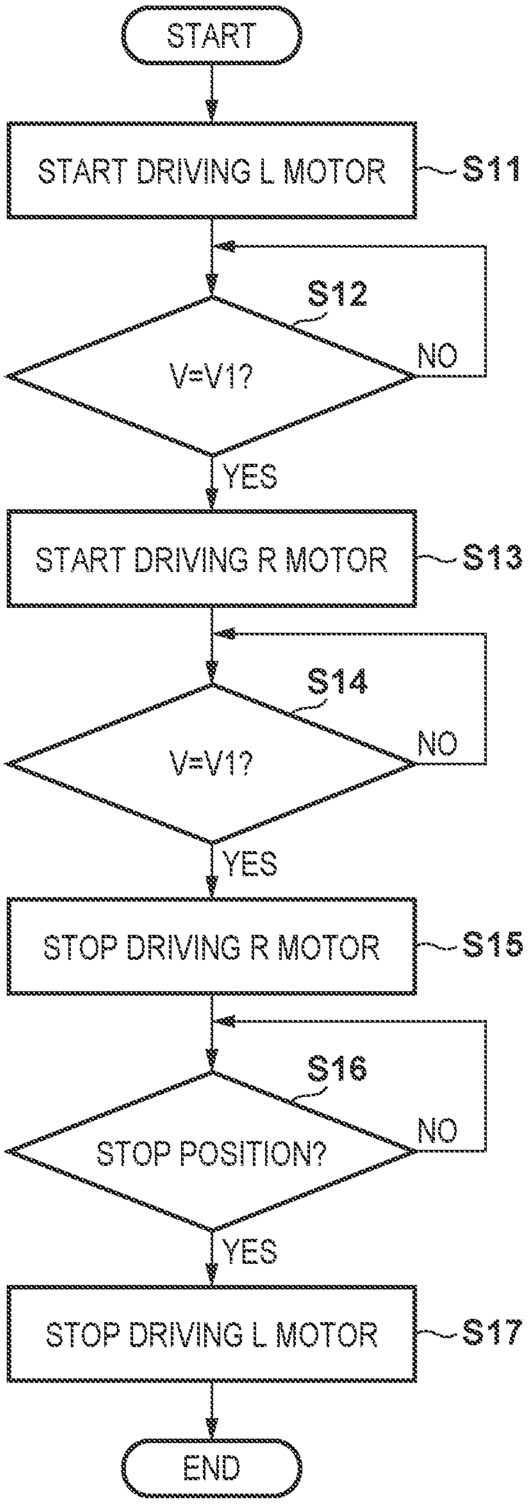
FIG. 8 is a flowchart showing a control example.

Next, FIG. 8 is a flowchart showing an example of processing performed by the printing control unit 25, which is an example of movement control in backward movement of the carriage 3, and FIGS. 9A to 9D are views for explaining the operation of the carriage 3. FIG. 8 particularly shows an example of processing regarding switching of operations of the carriage motors 61R and 61L. In FIGS. 9A to 9D, a solid arrow indicating the rotation direction of each of the pulleys 60R and 60L indicates driving-rotation, and a broken arrow indicates driven-rotation.

Figure 9A:
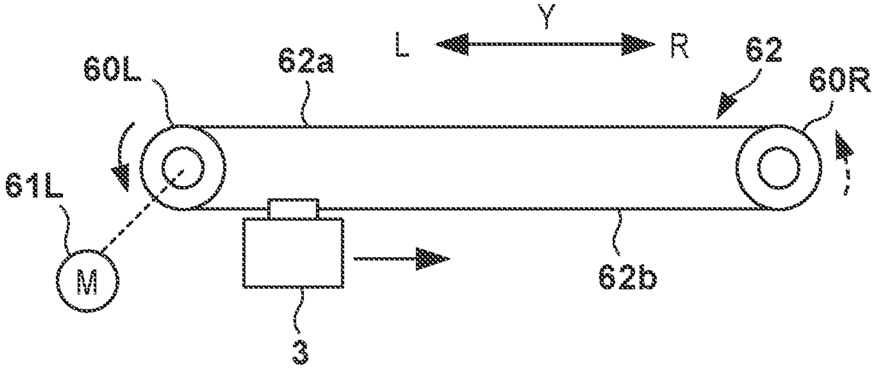
FIGS. 9A to 9D are views for explaining an operation of the carriage.

In step S11 of FIG. 8, driving of the carriage motor 61L is started. It is different from the forward movement in that the carriage motor 61L is driven first in the backward movement. With this, the pulley 60L is driving-rotated as shown in FIG. 9A, the timing belt 62 is caused to travel, and the pulley 60R is driven-rotated. An appropriate tension is applied to the travel region 62*a*, and generation of a slack can be prevented.

Figure 9B:
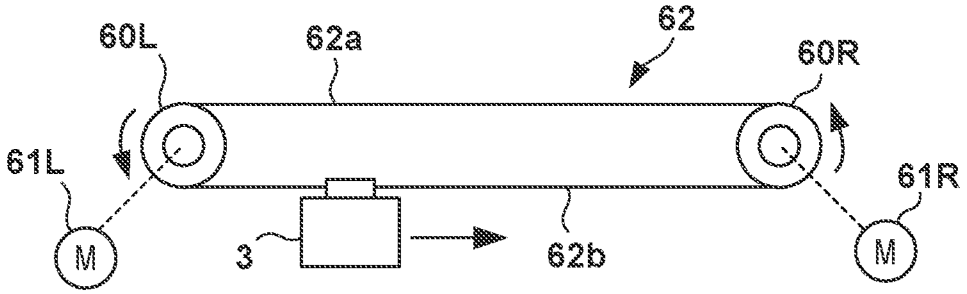

In step S12 of FIG. 8, based on a detection result of the encoder sensor 9, it is determined whether the velocity of the carriage 3 has reached the threshold velocity (velocity V1). If the velocity of the carriage 3 has reached the threshold velocity (velocity V1), the process advances to step S13. In step S13, driving of the carriage motor 61R is started. With this, as shown in FIG. 9B, the driving-rotation of the pulley 60R is performed in addition to the driving-rotation of the pulley 60L.

Figure 9C:
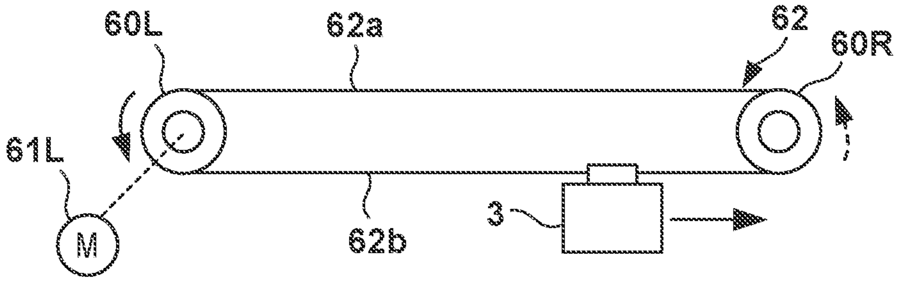

With the control as described above, the velocity of the carriage 3 reaches the velocity V2. Then, the carriage 3 is moved at a constant velocity, and printing scan is performed. After that, if the position of the carriage 3 reaches the deceleration position, deceleration of the carriage 3 is started. In step S14 of FIG. 8, based on a detection result of the encoder sensor 9, it is determined whether the velocity of the carriage 3 has decreased to the threshold velocity (velocity V1). If the velocity of the carriage 3 has decreased to the velocity V1, the process advances to step S15. In step S15, driving of the carriage motor 61R is stopped. Thus, the pulley 60R is driven-rotated again as shown in FIG. 9C.

Figure 9D:
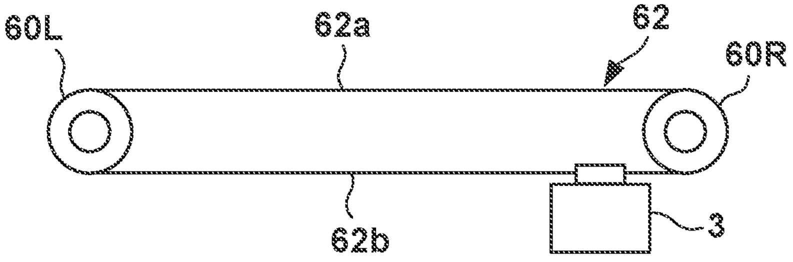

In step S16, based on a detection result of the encoder sensor 9, it is determined whether the carriage 3 has reached the stop position. If the carriage 3 has reached the stop position, the process advances to step S17 and the carriage motor 61L is stopped (FIG. 9D). After the deceleration of the carriage 3 is started, during the period from the velocity V1 to the stop, the pulley 60L is driving-rotated and the pulley 60R is driven-rotated. Therefore, upon the stop, the timing belt 62 stops while an appropriate tension is applied to the travel region 62*a*. In the next forward movement, generation of a slack in the travel region 62*a* can be suppressed and the responsiveness of the carriage 3 can be improved.

Other Embodiments

In the above-described embodiment, when accelerating the carriage 3, switching from driving of one carriage motor alone to driving of both carriage motors is performed on the condition that the velocity of the carriage 3 has reached V1. However, the threshold velocity is not limited to V1, and a velocity lower than V1 may be used. Similarly, when decelerating the carriage 3, the threshold velocity for switching from driving of both carriage motors to driving of one carriage motor alone is not limited to V1, and a velocity lower than V1 may be used. Different threshold velocities may be used for the acceleration and the deceleration. For example, if the responsiveness of the carriage 3 at the time of acceleration is low, the threshold velocity for the acceleration may be higher than the threshold velocity for the deceleration.

In the above-described embodiment, when accelerating the carriage 3, driving of one carriage motor alone is performed until the velocity of the carriage 3 reaches V1. However, driving of both carriage motors may be performed from the start of movement of the carriage 3. In forward movement, the output (torque here) of the carriage motor 61L may be controlled from a state lower than the output of the carriage motor 61R to a state higher than the lower state. Switching from the low state to the high state may be performed based on the velocity of the carriage 3. If the velocity of the carriage 3 has reached V1, the switching may be performed. In the low state, for example, the duty ratio of PWM control of the carriage motor 61L may be set equal to or lower than half the duty ratio of the carriage motor 61R. In the high state, for example, the duty ratio of PWM control of the carriage motor 61L may be set equal to the duty ratio of the carriage motor 61R. Similarly, in backward movement, the output of the carriage motor 61R may be controlled from a state lower than the output of the carriage motor 61L to a state higher than the lower state.

In the above-described embodiment, when decelerating the carriage 3, driving of one carriage motor alone is performed until the velocity of the carriage 3 reaches V1. However, driving of both carriage motors may be performed until the carriage 3 stops. In forward movement, from the start of deceleration of the carriage 3 to the stop, the output (torque here) of the carriage motor 61L may be controlled to a state lower than the output of the carriage motor 61R. The timing of setting the output of the carriage motor 61L in the lower state may be based on whether the carriage 3 has decelerated to the above-described threshold velocity. The lower state may be a state in which the rotation direction of the carriage motor 61L is set in the reverse direction (the direction for moving the carriage 3 in the backward direction). Similarly, in backward movement, from the start of deceleration of the carriage 3 to the stop, the output (torque here) of the carriage motor 61R may be controlled to a state lower than the output of the carriage motor 61L. The timing of setting the output of the carriage motor 61R in the lower state may be based on whether the carriage 3 has decelerated to the above-described threshold velocity. Further, the lower state may be a state in which the rotation direction of the carriage motor 61R is set in the reverse direction (the direction for moving the carriage 3 in the forward direction).

In the above-described embodiment, an example has been described in which, as forward movement, the carriage 3 moves from the right end of the movement range to the left end, but similar control can also be employed in a case in which the carriage 3 moves from a midpoint of the movement range to the left end or a case in which the carriage 3 moves from the right end of the movement range to a midpoint. Similarly, an example has been described in which, as backward movement, the carriage 3 moves from the left end of the movement range to the right end, but similar control can also be employed in a case in which the carriage 3 moves from a midpoint of the movement range to the right end or a case in which the carriage 3 moves from the left end of the movement range to a midpoint.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081835, filed May 13, 2021, which is hereby incorporated by reference herein in its entirety.

What is claimed is:

1. A printing apparatus comprising:
a carriage mounted with a printing unit configured to perform printing on a print medium;
a belt configured to reciprocate the carriage in a widthwise direction of the print medium;
a first motor configured to drive the belt at one end in the widthwise direction;
a second motor configured to drive the belt at the other end in the widthwise direction; and
a control unit configured to control the first motor and the second motor,
wherein the control unit performs first control by driving the first motor in which the carriage moves from a state in which the carriage is stopped, and
in the first control, the second motor is controlled from a first state in which an output torque of the second motor is lower than an output torque of the first motor to a second state in which the output torque of the second motor is higher than the output torque of the second motor in the first state.

2. The apparatus according to claim 1, wherein
in the first control the carriage moves from a side of the first motor to a side of the second motor in the widthwise direction.

3. The apparatus according to claim 1, wherein
the control unit performs second control in which the carriage moves from a state in which the carriage is stopped by driving the second motor, and
in the second control, the first motor is controlled from a third state in which the output torque of the first motor is lower than the output torque of the second motor to a fourth state in which the output torque of the first motor is higher than the output torque of the first motor in the third state.

4. The apparatus according to claim 3, wherein
the first control is performed when a movement direction of the carriage is a first movement direction, and
the second control is performed when the movement direction of the carriage is a second movement direction.

5. The apparatus according to claim 3, wherein
the first motor is not driven in the third state.

6. The apparatus according to claim 3, wherein
the carriage is accelerated to a predetermined velocity and moves at the predetermined velocity in the second control, and
in the second control, the first motor is controlled from the third state to the fourth state by a time when the carriage is accelerated to the predetermined velocity.

7. The apparatus according to claim 6, wherein
in the second control, the first motor is controlled from the third state to the fourth state if the carriage has reached a threshold velocity lower than the predetermined velocity.

8. The apparatus according to claim 6, wherein
the carriage is decelerated and stopped after moving the carriage at the predetermined velocity in the second control, and
during a period from a start of deceleration to a stop of the carriage in the second control, the first motor is controlled to a state in which the output torque of the first motor is lower than the output torque of the second motor.

9. The apparatus according to claim 8, wherein
the first motor is not driven in the state.

10. The apparatus according to claim 1, wherein
the second motor is not driven in the first state.

11. The apparatus according to claim 1, wherein
the carriage is accelerated to a predetermined velocity and moves at the predetermined velocity in the first control, and
in the first control, the second motor is controlled from the first state to the second state by a time when the carriage is accelerated to the predetermined velocity.

12. The apparatus according to claim 11, wherein
in the first control, the second motor is controlled from the first state to the second state if the carriage has reached a threshold velocity lower than the predetermined velocity.

13. The apparatus according to claim 11, wherein
the carriage is decelerated and stopped after moving at the predetermined velocity in the first control, and
during a period from a start of deceleration to a stop of the carriage in the first control, the second motor is controlled to a state in which the output torque of the second motor is lower than the output torque of the first motor.

14. The apparatus according to claim 13, wherein
the second motor is not driven in the state.

15. The apparatus according to claim 1, wherein
the first motor and the second motor are the same product.

16. The printing apparatus according to claim 1, wherein
the carriage moves in a first movement direction when the first motor rotates in a first rotation direction,
the carriage moves in the first movement direction when the second motor rotates in a second rotation direction,
the carriage moves in a second movement direction when the first motor rotates in a third rotation direction,
the carriage moves in the second movement direction when the second motor rotates in a fourth rotation direction, and
in the first control, the first motor does not rotate in the third rotation direction, and the second motor does not rotate in the fourth rotation direction.

17. A printing apparatus comprising:
a carriage mounted with a printing unit configured to perform printing on a print medium;
a belt configured to reciprocate the carriage in a widthwise direction of the print medium;
a first motor configured to drive the belt at one end in the widthwise direction;
a second motor configured to drive the belt at the other end in the widthwise direction; and
a control unit configured to control the first motor and the second motor,
wherein the control unit performs control for driving the first motor and the second motor to move the carriage at a predetermined velocity and then decelerate and stop the carriage, and
in the control, during a period from a start of deceleration to a stop of the carriage, one of the first motor or the second motor is controlled to a state in which an output torque of the one motor is lower than an output torque of the other motor.

18. The apparatus according to claim 17, wherein
the carriage moves in a first movement direction when the first motor rotates in a first rotation direction,
the carriage moves in the first movement direction when the second motor rotates in a second rotation direction,
the carriage moves in a second movement direction when the first motor rotates in a third rotation direction, the carriage moves in the second movement direction when the second motor rotates in a fourth rotation direction, and in the control, the first motor does not rotate in the third rotation direction, and the second motor does not rotate in the fourth rotation direction.

19. A carriage apparatus comprising:

a carriage;

a belt configured to reciprocate the carriage in a widthwise direction of a print medium;

a first motor configured to drive the belt at one end in the widthwise direction;

a second motor configured to drive the belt at the other end in the widthwise direction; and a control unit configured to control the first motor and the second motor, wherein the control unit performs first control by driving the first motor in which the carriage moves from a state in which the carriage is stopped, and in the first control, the second motor is controlled from a first state in which an output torque of the second motor is lower than an output torque of the first motor to a second state in which the output torque of the second motor is higher than the output torque of the second motor in the first state.

20. The apparatus according to claim 19, wherein the carriage moves in a first movement direction when the first motor rotates in a first rotation direction, the carriage moves in the first movement direction when the second motor rotates in a second rotation direction, the carriage moves in a second movement direction when the first motor rotates in a third rotation direction, the carriage moves in the second movement direction when the second motor rotates in a fourth rotation direction, and in the first control, the first motor does not rotate in the third rotation direction, and the second motor does not rotate in the fourth rotation direction.

* * * * *